(12) United States Patent
Kato et al.

(10) Patent No.: US 11,788,581 B2
(45) Date of Patent: Oct. 17, 2023

(54) BEARING UNIT AND STRAIN WAVE GEARING

(71) Applicant: HARMONIC DRIVE SYSTEMS INC., Tokyo (JP)

(72) Inventors: Yuki Kato, Azumino (JP); Douglas Olson, Beverly, MA (US); Brian Coyne, Beverly, MA (US)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 267 days.

(21) Appl. No.: 17/419,950

(22) PCT Filed: Apr. 27, 2020

(86) PCT No.: PCT/JP2020/018040
§ 371 (c)(1),
(2) Date: Jun. 30, 2021

(87) PCT Pub. No.: WO2021/220375
PCT Pub. Date: Nov. 4, 2021

(65) Prior Publication Data
US 2022/0316528 A1    Oct. 6, 2022

(51) Int. Cl.
*F16C 41/00*    (2006.01)
*F16C 33/58*    (2006.01)
(Continued)

(52) U.S. Cl.
CPC .......... *F16C 41/007* (2013.01); *F16C 33/581* (2013.01); *F16C 33/60* (2013.01);
(Continued)

(58) Field of Classification Search
CPC .......... A61B 34/30; A61B 2017/00477; A61B 2034/302; F16H 55/17; F16H 55/18; F16H 55/24
See application file for complete search history.

(56) References Cited

U.S. PATENT DOCUMENTS

2011/0239788 A1* 10/2011 Nagasaka .............. B25J 13/085
                                                                  901/19
2019/0212217 A1    7/2019 Haehnle et al.

FOREIGN PATENT DOCUMENTS

JP    2009288198 A    12/2009
JP    2011209099 A    10/2011
(Continued)

OTHER PUBLICATIONS

HarmonicDrive (TM), pp. 1-3.*
(Continued)

*Primary Examiner* — Terence Boes
(74) *Attorney, Agent, or Firm* — BUCHANAN INGERSOLL & ROONEY PC

(57) ABSTRACT

A bearing unit is provided with a strain element for torque detection. The strain element is provided with a first annular part attached to a rotation-side member, a second annular part attached to a load-side member, and a plurality of ribs serving as strained parts linking the first annular part and the second annular part together. One of an inner race and an outer race is integrally formed on the first annular part of the strain element. Deformation, which occurs in the ribs of the strain element due to torque exerted on the rotation-side member from the load-side member, is detected by a strain gauge, etc., and converted to torque. The strain element for torque detection can be incorporated into a motor, a reducer, or another rotary propulsion unit without the need for a dedicated installation space and without the need for fastening fittings, etc.

2 Claims, 4 Drawing Sheets

(51) Int. Cl.
*F16C 33/60* (2006.01)
*F16H 1/32* (2006.01)
*F16H 49/00* (2006.01)

(52) U.S. Cl.
CPC ............. *F16H 1/32* (2013.01); *F16H 49/001* (2013.01); *F16C 2361/61* (2013.01); *F16C 2361/65* (2013.01); *F16C 2380/27* (2013.01)

(56) References Cited

FOREIGN PATENT DOCUMENTS

| JP | 2018132154 A | 8/2018 |
| JP | 2019526801 A | 9/2019 |
| WO | 2018151210 A1 | 8/2018 |

OTHER PUBLICATIONS

International Search Report (PCT/ISA/210) and Written Opinion (PCT/ISA/237) dated Jul. 14, 2020, by the Japanese Patent Office as the International Searching Authority for International Application No. PCT/JP2020/018040.

* cited by examiner (a)

(b)

(a)

(b)

(a)

(b)

BEARING UNIT AND STRAIN WAVE GEARING

TECHNICAL FIELD

The present invention relates to a bearing unit provided with a strain element for torque detection and a strain wave gearing in which the bearing unit is incorporated.

BACKGROUND ART

In a torque detector provided with a strain element, the strain element, which has predetermined elastic characteristics, is bridged between, for example, a rotating shaft and a load-side member, strain produced in the strain element is measured by a strain gauge or another detection element, and torque exerted on the rotating shaft from the load-side member is detected. Such torque detectors are publicly known and are disclosed in Patent Document 1 (JP 2009-288198 A) and Patent Document 2 (JP 2018-132154 A).

The torque sensor disclosed in Patent Document 2 is incorporated into a reducer equipped with an electric motor. A wave gear is used in the reducer, and an internally toothed gear and an externally toothed gear are supported by a cross roller bearing so as to be capable of relative rotation. A strain element of a torque sensor is attached between the internally toothed gear and a unit housing, which are secured-side members. Strain is generated in the strain element due to circumferential displacement of the internally toothed gear caused by torque exerted on the internally toothed gear, and this strain is detected by a strain gauge. The strain element is held between the unit housing and an annular secured member attached to the internally toothed gear, and in this state, the internally toothed gear, the secured member, the strain element, and the unit housing are securely fastened using fastening bolts.

PRIOR ART LITERATURE

Patent Documents

Patent Document 1: JP-A 2009-288198
Patent Document 2: JP-A 2018-132154

SUMMARY OF THE INVENTION

Problems to be Solved by the Invention

In the prior art, to assemble a torque detector having a strain element structure in a motor, a reducer, a rotation actuator, or another rotary propulsion unit, an attachment portion on which the strain element is attached must be machined in the unit housing, a gear, or another rotation member, and additional attachment components and fastening fittings such as bolts and screws are required. To enable the unit to be made lightweight and more compact and to enable the number of components to be reduced, it is preferable that the space for attaching a torque detection unit having a strain element structure be kept small and that the additional attachment components can be reduced.

An object of the present invention is to focus on a bearing incorporated into a motor, a reducer, a rotation actuator, or another rotary propulsion unit, and to provide a bearing unit which is provided with raceway rings and in which a strain element of a torque detector is assembled in a compact form with a small installation space. Another object of the present invention is to provide a strain wave gearing having this bearing unit incorporated therein.

Means of Solving the Problems

To achieve the objects described above, the bearing unit of the present invention has:

a bearing provided with an outer race, an inner race, and a plurality of rolling elements rollably inserted in a raceway formed between the outer race and the inner race; and a strain element provided with a first annular part, a second annular part disposed coaxially with the first annular part, and strained parts that are continuous between the first annular part and the second annular part, one of the inner race and the outer race being integrally formed on the first annular part of the strain element or coaxially secured to the first annular part.

In a motor, a reducer, a rotation actuator, or another rotary propulsion unit, the bearing unit of the present invention is assembled as a bearing for supporting a rotating shaft of the propulsion unit in a rotatable state. One raceway ring in the bearing unit supporting the rotating shaft is integrated with the strain element for torque detection or secured to the strain element. There is no need to separately ensure space for incorporating the strain element for torque detection in the unit. Additionally, attachment components and fastening fittings for assembling the strain element are not required. As such, a torque detection unit provided with a strain element can be assembled in the unit compactly with a small installation space.

MODE FOR CARRYING OUT THE INVENTION

An embodiment of a bearing unit and a strain wave gearing to which the present invention is applied is described below with reference to the drawings. It is noted that the present invention is not limited to the structure of the embodiment.

Figure 1:
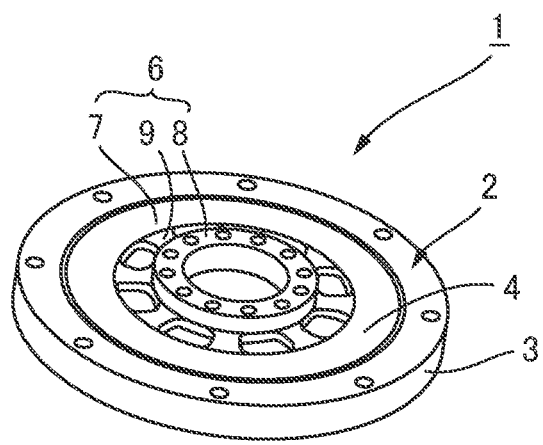
FIG. 1 is a perspective view and a perspective cross-sectional view of a bearing unit to which the present invention is applied.
Figure 1:
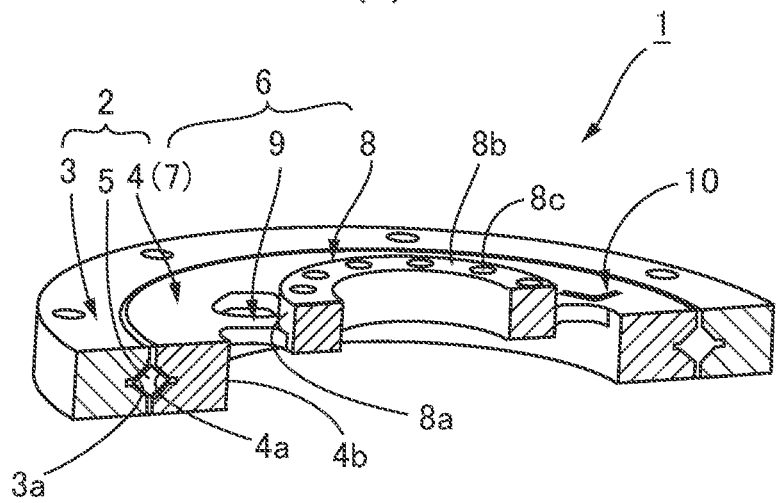

FIG. 1(a) is a perspective view of an example of a bearing unit according to the present invention, and FIG. 1(b) is a perspective cross-sectional view of the same. In a motor, a reducer, a rotation actuator, or another rotary propulsion unit (not shown), a bearing unit 1 is mounted between, for example, a rotating shaft (not shown) and a unit housing (not shown), and the bearing unit rotatably supports the rotating shaft. A load-side member (not shown) is rotatably propelled by output rotation of the rotating shaft.

The bearing unit 1 is provided with a cross roller bearing 2 and a strain element 6 for torque detection. The cross roller bearing 2 is provided with an outer race 3, an inner race 4, and a plurality of cylindrical rollers 5 inserted in a rollable state between the races. For example, in the rotary propulsion unit, the outer race 3 is secured to the unit housing, which is a secured-side member, and the inner race 4 of the cross roller bearing 2 is coaxially secured to the rotating shaft. An annular raceway having a rectangular cross section is formed by a V-shaped raceway groove 3a formed in an inner peripheral surface of the outer race 3 and a V-shaped raceway groove 4a formed in the outer peripheral surface of the inner race 4, and the cylindrical rollers 5 are inserted in a rollable state into the raceway.

In the present example, the inner race 4 and the strain element 6 for torque detection are integrally formed. In other words, these are manufactured as a single component. The strain element 6 is provided with a first annular part 7, a second annular part 8 concentrically disposed on an inner side of the first annular part 7, and a plurality of ribs 9 serving as strained parts that are continuous between a circular inner peripheral surface 4b of the first annular part 7 and a circular outer peripheral surface 8a of the second annular part 8. The raceway groove 4a is formed in a circular outer peripheral surface of the first annular part 7, and the first annular part 7 functions as the inner race 4. The ribs 9 are formed at equal angular intervals along a circumferential direction. An annular end surface 8b of the second annular part 8 is a load attachment surface to which the load-side member is coaxially secured, and a plurality of bolt holes 8c for fastening the load-side member are formed in this surface.

The first annular part 7 functioning as the inner race 4 attached to the rotating shaft of the rotary propulsion unit and the second annular part 8 attached to the load-side member are both rigid. By contrast, the ribs 9 have a preset elastic characteristic. Torque acting on the rotating shaft from the load-side member is transmitted via the strain element 6. Deformation corresponding to the magnitude of the transmitted torque is produced in the ribs 9 due to the elastic characteristic of the ribs 9 being appropriately set. A strain gauge 10 or another strain detection element is affixed to a surface of a rib 9. Torque is detected on the basis of a detection signal outputted from the strain gauge 10.

In the prior art, when a strain element for torque detection is incorporated into a motor, a reducer, a rotation actuator, or another rotary propulsion unit, space for attaching the strain element is ensured in the periphery of the rotating shaft and other members, and additional attachment components and fastening fittings such as bolts and screws are required. If the bearing unit 1 of the present example is used, there is no need to separately ensure space for attaching the strain element 6, and additional components and fastening fittings are not required. As such, the bearing unit is advantageous in making the gearing small, compact, and lightweight.

Furthermore, because the strain element 6 and the inner race 4 are integrated, there are no adverse situations such as less precise assembling of the strain element 6. There is also no incidence of thermal strain between components due to a difference in materials. As such, an improvement in torque detection precision can be expected.

Figure 2:
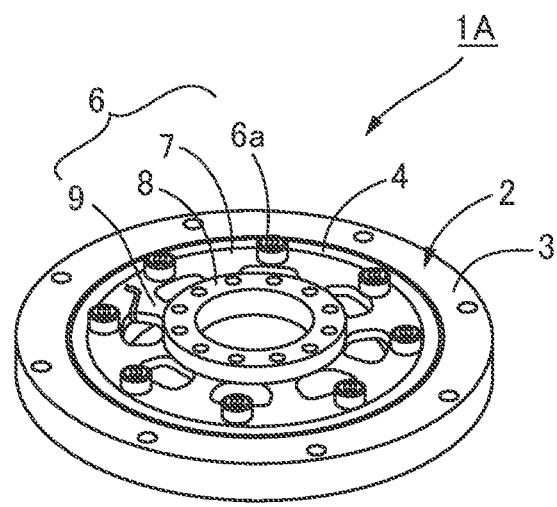
FIG. 2 is a perspective view and a perspective cross-sectional view of a modification of the bearing unit of FIG. 1.
Figure 2:
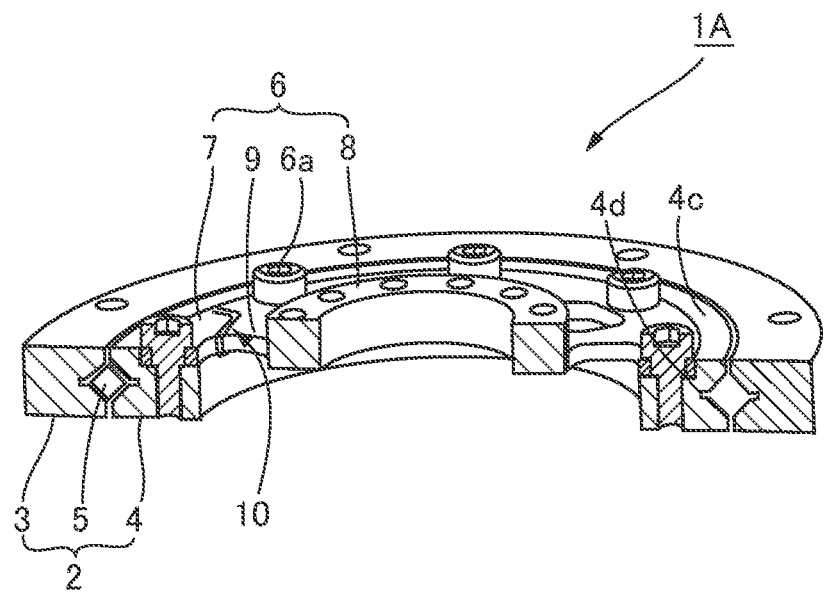

In the bearing unit 1 described above, the strain element 6 and the inner race 4 are manufactured as a single member. Another possible structure is one in which the strain element 6 and the inner race 4 are manufactured as separate members and the inner race 4 is securely fastened to the first annular part 7 of the strain element 6. A bearing unit 1A of this case is shown in FIG. 2.

FIG. 2(a) is a perspective view of the bearing unit 1A, and FIG. 2(b) is a perspective cross-sectional view of the same. The basic configuration of the bearing unit 1A is the same as that of the bearing unit 1 described above; therefore, the same symbols are used for corresponding parts and descriptions thereof are omitted. In the bearing unit 1A of the present example, a strain element attachment part 4d is formed in advance on an inner peripheral portion of an annular end surface 4c of the inner race 4. The strain element attachment part 4d is provided with an annular step part having a fixed depth, and a plurality of bolt holes formed at equal angular intervals along the circumferential direction in an end surface defining the bottom of the step part. The first annular part 7 on the outer peripheral side of the strain element 6 is coaxially mounted to the strain element attachment part 4d of the inner race 4 and is securely fastened with fastening bolts 6a.

Figure 3:
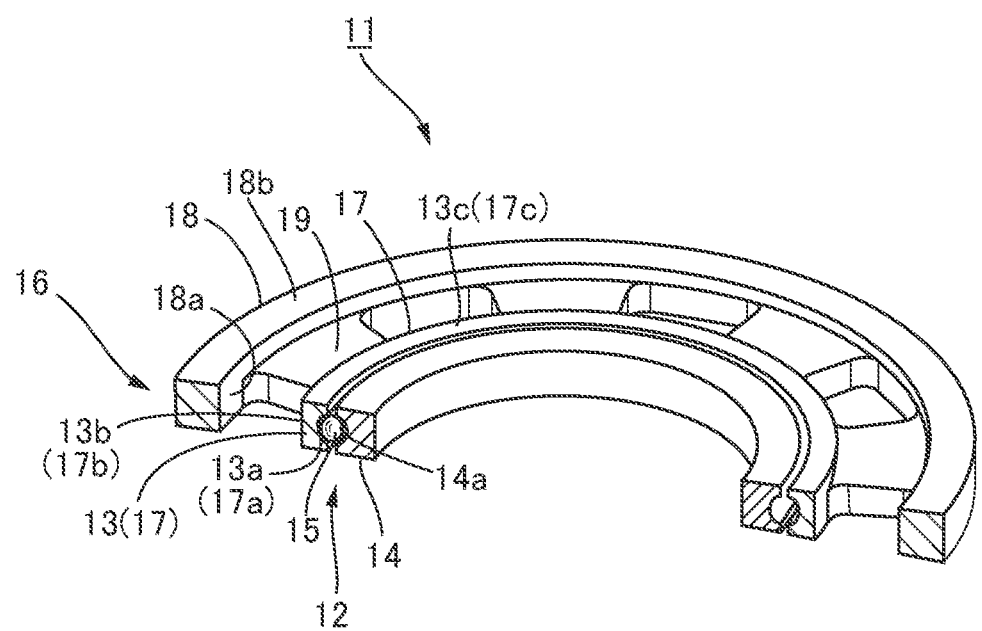
FIG. 3 is a perspective cross-sectional view of yet another example of a bearing unit to which the present invention is applied.

FIG. 3 is a perspective cross-sectional view of another example of a bearing unit to which the present invention is applied. In a bearing unit 11, an outer race and a strain element are manufactured as a single component. In a motor, a reducer, a rotation actuator, or another rotary propulsion unit (not shown), the bearing unit 11 is mounted between a rotation-side member (not shown) and a secured-side member (not shown), and the bearing unit rotatably supports the rotation-side member. A load-side member (not shown) is rotatably propelled by output rotation of the rotation-side member.

The bearing unit 11 is provided with a ball bearing 12 and a strain element 16 for torque detection. An inner race 14 of the ball bearing 12 is secured to the secured-side member (not shown). The load-side member (not shown) is coaxially secured to an outer race 13 of the ball bearing 12. An annular raceway is formed by a raceway groove 13a formed in an inner peripheral surface of the outer race 13 and a raceway groove 14a formed in an outer peripheral surface of the inner race 14, and balls 15 are inserted in a rollable state into the raceway.

In the present example, the outer race 13 and the strain element 16 are formed integrally. In other words, these components are manufactured as a single component. The strain element 16 is provided with a first annular part 17 functioning as the outer race 13, a second annular part 18 concentrically disposed on an outer side of the first annular part 17, and a plurality of ribs 19 serving as strained parts that are continuous between a circular outer peripheral surface 13b (17b) of the first annular part 17 and a circular inner peripheral surface 18a of the second annular part 18. The raceway groove 13a is formed in the circular inner peripheral surface 13a (17a) of the first annular part 17. The ribs 19 are formed at equal angular intervals along a circumferential direction. The load-side member is attached to an annular end surface 13c (17c) of the first annular part 17 (outer race 13). The rotation-side member is coaxially secured to the annular end surface 18b of the second annular part 18.

The first annular part 17 (outer race 13) attached to the load-side member and the second annular part 18 attached to the rotation-side member are both rigid. The ribs 19 have a preset elastic characteristic. Torque acting on the rotation-side member from the load-side member is transmitted via the strain element 16. Strain corresponding to the magnitude of the transmitted torque is produced in the ribs 19 due to the elastic characteristic of the ribs 19 being appropriately set. A strain gauge or another strain detection element (not shown) is affixed to a surface of a rib 19. Torque is detected on the basis of a detection signal outputted from the strain gauge.

Figure 4:
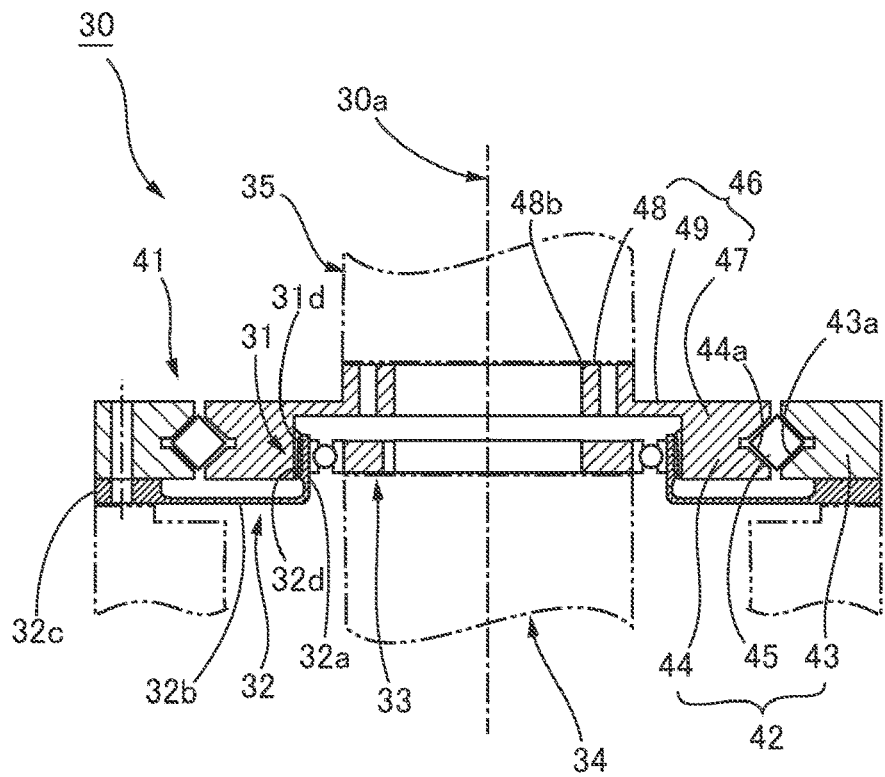
FIG. 4 is a cross-sectional view and a perspective cross-sectional view of an example of a strain wave gearing having incorporated therein a bearing unit to which the present invention is applied.
Figure 4:
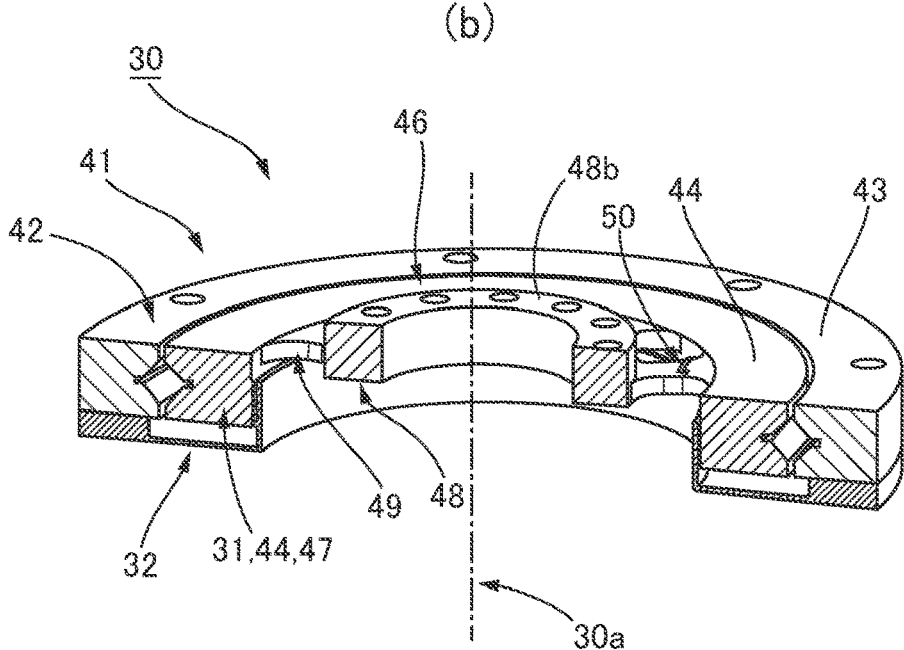

FIG. 4(a) is a cross-sectional view of an example of a strain wave gearing having incorporated therein a bearing unit to which the present invention is applied, and FIG. 4(b) is a perspective cross-sectional view of the same.

A strain wave gearing 30 is provided with a rigid internally toothed gear 31 having an annular shape, a flexible externally toothed gear 32 having a top hat shape, a wave generator 33 that causes the externally toothed gear 32 to flex into a non-circular shape and partially mesh with the internally toothed gear 31, and a bearing unit 41 that supports the internally toothed gear 31 and the externally toothed gear 32 so that the gears are able to rotate relative to each other. For example, the wave generator 33 is a rotation input member, and rotation is inputted thereto from a rotating shaft 34 of a motor, etc. The externally toothed gear 32 is a secured-side member and the internally toothed gear 31 is a rotation-side member. A load-side member 35 is rotatably propelled by output rotation from the internally toothed gear 31. The wave generator 33 is omitted in FIG. 4(b).

The externally toothed gear 32 is provided with a cylindrical barrel part 32a, a diaphragm 32b expanding radially outward from one end of the barrel part, and an annular boss 32c, which is a rigid body integrally formed on an outer peripheral edge of the diaphragm 32b. External teeth 32d are formed on an outer peripheral surface of the cylindrical barrel part 32a. The location where the external teeth 32d are formed is caused to flex into a non-circular shape, e.g., an ellipsoidal shape by the wave generator 33, and the external teeth are partially meshed with internal teeth 31d of the internally toothed gear 31.

The bearing unit 41 is provided with a cross roller bearing 42 and a strain element 46. The cross roller bearing 42 is provided with an outer race 43, an inner race 44, and a plurality of cylindrical rollers 45 inserted in a rollable state between the races. The outer race 43 is coaxially secured to the annular boss 32c of the externally toothed gear 32, which is a secured-side member. An annular raceway having a rectangular cross section is formed by a V-shaped raceway groove 43a formed in an inner peripheral surface of the outer race 43 and a V-shaped raceway groove 44a formed in an outer peripheral surface of the inner race 44, and the cylindrical rollers 45 are inserted in a rollable state into the raceway.

The strain element 46 is provided with a first annular part 47, a second annular part 48 concentrically disposed on an inner side of the first annular part 47, and a plurality of ribs 49 serving as strained parts that link a circular inner peripheral surface of the first annular part 47 and a circular outer peripheral surface of the second annular part 48. The ribs 49 are formed at equal angular intervals along a circumferential direction. An annular end surface 48b of the second annular part 48 is a load attachment surface to which the load-side member 35 is coaxially secured, and a plurality of bolt holes for fastening the load-side member are formed in this surface.

In this example, the internally toothed gear 31, the inner race 44, and the first annular part 47 of the strain element 46 are integrally formed. In other words, these three members are manufactured as a single component. Specifically, the raceway groove 44a of the inner race 44 is formed in the circular outer peripheral surface of the first annular part 47 of the strain element 46, the ribs 49 are joined to the circular inner peripheral surface of the first annular part 47 in a location on one end side in the direction of a center axis 30a, and the internal teeth 31d are formed in a location on the other end side.

The first annular part 47, which is a rotation-side member and which functions as the internally toothed gear 31 and the inner race 44, and the second annular part 48 attached to the load-side member are both rigid. By contrast, the ribs 49 have a preset elastic characteristic. Torque acting on the internally toothed gear 31 from the load-side member is transmitted via the strain element 46. Strain corresponding to the magnitude of the transmitted torque is produced in the ribs 49 due to the elastic characteristic of the ribs 49 being appropriately set. A strain gauge 50 or another strain detection element is affixed to a surface of a rib 49. Torque is detected on the basis of a detection signal outputted from the strain gauge 50.

Thus, in the strain wave gearing 30 of the present example, the first annular part 47, which is located on an inner peripheral side of the strain element 46, is both the inner race 44 in which the V-shaped raceway groove 44a is formed in the circular outer peripheral surface, and the internally toothed gear 31 in which the internal teeth 31d are formed in the circular inner peripheral surface. The strain element 46, the inner race 44, and the internally toothed gear 31 are manufactured as a single component.

Therefore, if the bearing unit 41 of the present example is used, there is no need to separately ensure space for attaching the strain element 46. Additionally, because the strain element 46, the inner race 44, and the internally toothed gear 31 are integrated, additional components and fastening fittings for incorporating the strain element 46 are not required. As such, the bearing unit is advantageous in making the gearing small, compact, and lightweight.

Furthermore, because the strain element 46, the inner race 44, and the internally toothed gear 31 are manufactured as a single component, it is possible to avoid adverse situations, such as less precise assembly, which occur when the three components are assembled. There is also no incidence of thermal strain between components due to a difference in materials. As such, an improvement in torque detection precision can be expected.

The invention claimed is:

1. A bearing unit comprising:
   a bearing provided with an outer race, an inner race, a raceway formed between the outer race and the inner race, and a plurality of rolling elements rollably inserted in the raceway; and
   a strain element provided with a first annular part, a second annular part disposed coaxially with the first annular part, and strained parts that are continuous between the first annular part and the second annular part,
   one of the inner race and the outer race being integrally formed on the first annular part of the strain element or coaxially secured to the first annular part, wherein
   the outer race is integrally formed on or coaxially secured to the first annular part,
   the second annular part is coaxially disposed on an outer side in a radial direction of the first annular part,
   the strained parts are a plurality of ribs that join the first annular part and the second annular part together along the radial direction, and
   the ribs are disposed at equal angular intervals along a circumferential direction.

2. A strain wave gearing according to claim comprising:
   a rigid internally toothed gear;
   a flexible externally toothed gear;
   a wave generator that causes the externally toothed gear to flex into a non-circular shape and partially mesh with the internally toothed gear; and a bearing unit which supports the internally toothed gear and the externally toothed gear such that the gears are able to rotate relative to each other, said bearing unit comprising:
  a bearing provided with an outer race, an inner race, a raceway formed between the outer race and the inner race, and a plurality of rolling elements rollably inserted in the raceway; and
  a strain element provided with a first annular part, a second annular part disposed coaxially with the first annular part, and strained parts that are continuous between the first annular part and the second annular part,
  one of the inner race and the outer race being integrally formed on the first annular part of the strain element or coaxially secured to the first annular part, wherein:
the inner race of the bearing unit is integrally formed on the first annular part of the strain element;
the second annular part is coaxially disposed on an inner side in a radial direction of the first annular part;
the strained parts are a plurality of ribs that join the first annular part and the second annular part together along the radial direction;
the ribs are disposed at equal angular intervals along a circumferential direction; and
the first annular part is provided with an inner-race-side raceway groove formed in a circular outer peripheral surface thereof and internal teeth formed in a circular inner peripheral surface thereof, and the first annular part functions as the inner race and the internally toothed gear.

\* \* \* \* \*